United States Patent

Fournier et al.

[11] Patent Number: 6,080,960
[45] Date of Patent: Jun. 27, 2000

[54] METHOD FOR JOINING TWO PARTS BY HETEROGENEOUS WELDING AND USE THEREOF

[75] Inventors: Yves Fournier, Chantenoy Le Royal; Alain Peigney, Saint Loup De Varennes; Léon Dunand-Roux, Chantenoy Le Royal, all of France

[73] Assignee: Framatome, Courbevoie, France

[21] Appl. No.: 09/091,668

[22] PCT Filed: Nov. 20, 1996

[86] PCT No.: PCT/FR96/01838

§ 371 Date: Jul. 28, 1998

§ 102(e) Date: Jul. 28, 1998

[87] PCT Pub. No.: WO97/22432

PCT Pub. Date: Jun. 26, 1997

[30] Foreign Application Priority Data

Dec. 18, 1995 [FR] France .................................. 95 14991

[51] Int. Cl.⁷ ........................................................ B23K 9/23
[52] U.S. Cl. .................................. 219/137 WM; 219/61; 219/125.11
[58] Field of Search ..................... 219/137 WM, 219/125.11, 137 R, 137 PS, 61, 75, 130.51, 76.14

[56] References Cited

U.S. PATENT DOCUMENTS

| | | | |
|---|---|---|---|
| 2,191,482 | 2/1940 | Hopkins | 219/76.14 |
| 2,963,129 | 12/1960 | Eberle . | |
| 4,110,590 | 8/1978 | Batey et al. | 219/75 |
| 4,366,362 | 12/1982 | Ohta et al. | 219/130.51 |
| 4,373,125 | 2/1983 | Kazlauskas | 219/125.11 |
| 4,703,885 | 11/1987 | Lindgren et al. . | |
| 5,132,078 | 7/1992 | Cai . | |
| 5,357,078 | 10/1994 | Smith et al. . | |

FOREIGN PATENT DOCUMENTS

| | | |
|---|---|---|
| 0 433 179 | 6/1991 | European Pat. Off. . |
| 2 388 627 | 11/1978 | France . |
| 2 701 880 | 2/1994 | France . |

OTHER PUBLICATIONS

Weisselberg, A., et al., "The technological problems of submerged-arc welding in narrow weld gaps," vol. 5, No. 1, Jan. 1, 1991, pp. 69–76, 2390 Welding Intl., Abington, Cambridge, GB.

*Primary Examiner*—Clifford C. Shaw
*Attorney, Agent, or Firm*—Pollock Vande Sande & Amernick

[57] ABSTRACT

The machined ends of two parts (2, 4) are arranged in facing positions to form a welding bevel (6) between the parts (2, 4). A series of layers of filler metal are deposited one on top of the other in the welding bevel (6) in a direction thereof corresponding to the width of the parts (2, 4), by melting a wire (14) supplied at a predetermined feed rate to an electric arc between the parts to be welded and an electrode (13) supplied with a predetermined welding current and voltage. Each layer of filler metal essentially consists of a single weld bead across the full width of the bevel (6). The electric welding current and voltage and the feed rate of the wire (14) are predetermined in accordance with the width of the bevel (6).

6 Claims, 4 Drawing Sheets

METHOD FOR JOINING TWO PARTS BY HETEROGENEOUS WELDING AND USE THEREOF

FIELD OF THE INVENTION

The invention concerns a method of jointing a first part made of low alloy constructional steel and a second part made of austenitic stainless steel by heterogeneous welding.

BACKGROUND OF THE INVENTION

Nuclear reactors in general and pressurized water nuclear reactors in particular include components, such as the reactor containment vessel, steam generators and the pressurizer which are made of low alloy high strength constructional steel lined with a layer of stainless steel, and connected by one or more connecting tubes to one or more austenitic stainless steel pipes constituting parts of the primary circuit of the reactor, for example.

Steam generators of pressurized water nuclear reactors include a water box having a hemispherical wall constituting the lower part of the steam generator in which are two connecting tubes welded to two pipes of the primary circuit of the reactor.

The connecting tubes of the steam generator, which are made of constructional steel lined with stainless steel, must be butt-welded to an austenitic stainless steel pipe.

It is therefore necessary to make a heterogeneous welded joint between the connecting tube and the pipe, the heterogeneous weld being effected by depositing a filler metal into a groove formed between the connecting tube and the pipe or between the connecting tube and an intermediate austenitic stainless steel connector.

Before effecting the heterogeneous weld between the connecting tube and the pipe or the intermediate connector, it is necessary to deposit a thick layer of stainless steel or nickel alloy onto an end part of the connecting tube constituting one surface delimiting the groove into which the filler metal is deposited during welding.

A process of this kind, which necessitates preparation of the areas of the parts to be jointed after they are machined, is difficult and necessitates a relatively long execution time.

The welded joint is effected by juxtaposing weld beads in the form of successive layers superposed in the direction of the thickness of the parts, this direction being substantially perpendicular to the longitudinal direction of the welded joint. Each of the layers which occupies all of the width of the groove between the two parts, in a direction perpendicular both to the longitudinal direction and to the direction of the thickness of the parts, is made up of a possibly large number of juxtaposed weld beads, depending on the average width of the groove.

If the TIG process is used, each of the weld beads is obtained by melting a filler wire by means of an electrode fed with a particular current at a particular voltage. The filler metal wire which is fed at a fixed speed into the weld area is melted by the electric arc formed between the electrode and the parts to be welded in the groove.

It is also possible to use other welding processes such as the covered electrode process.

Obtaining successive layers of filler metal having a substantially constant thickness combined with very high quality and a good consistency of the filler metal requires totally accurate control of welding conditions during the deposition of each of the weld beads.

Prior art heterogeneous welding jointing processes are therefore complex and their execution times can be very long.

SUMMARY OF THE INVENTION

The object of the invention is to propose a method of jointing by heterogeneous welding a first part made of constructional steel and a second part made of austenitic stainless steel, consisting in disposing machined ends of the parts face-to-face to constitute a welding groove extending in a longitudinal direction between the parts and depositing a filler metal in the welding groove in successive layers superposed in a direction perpendicular to the longitudinal direction of the groove corresponding to the thickness of the parts, by melting a wire fed at a particular speed by an electric arc formed between an electrode fed with a particular welding current at a particular voltage and the parts to be welded which are separated, in a direction perpendicular to the longitudinal direction of the groove and to the direction of the thickness of the parts, by a distance constituting the width of the groove, this method making the welded joint quickly, in a simple manner and with perfect quality of execution.

To this end, each layer of filler metal essentially comprises a weld bead obtained by melting the filler metal wire occupying practically all of the width of the groove, and the welding current and voltage and the wire feed rate are determined according to the width of the groove.

BRIEF DESCRIPTION OF THE DRAWING

In order for the invention to be properly understood, a jointing method in accordance with the invention using heterogeneous welding will now be described by way of example with reference to the accompanying drawings, together with its use for jointing a primary pipe to a connecting tube of a steam generator of a pressurized water nuclear reactor.

DESCRIPTION OF PREFERRED EMBODIMENT

Figure 1:
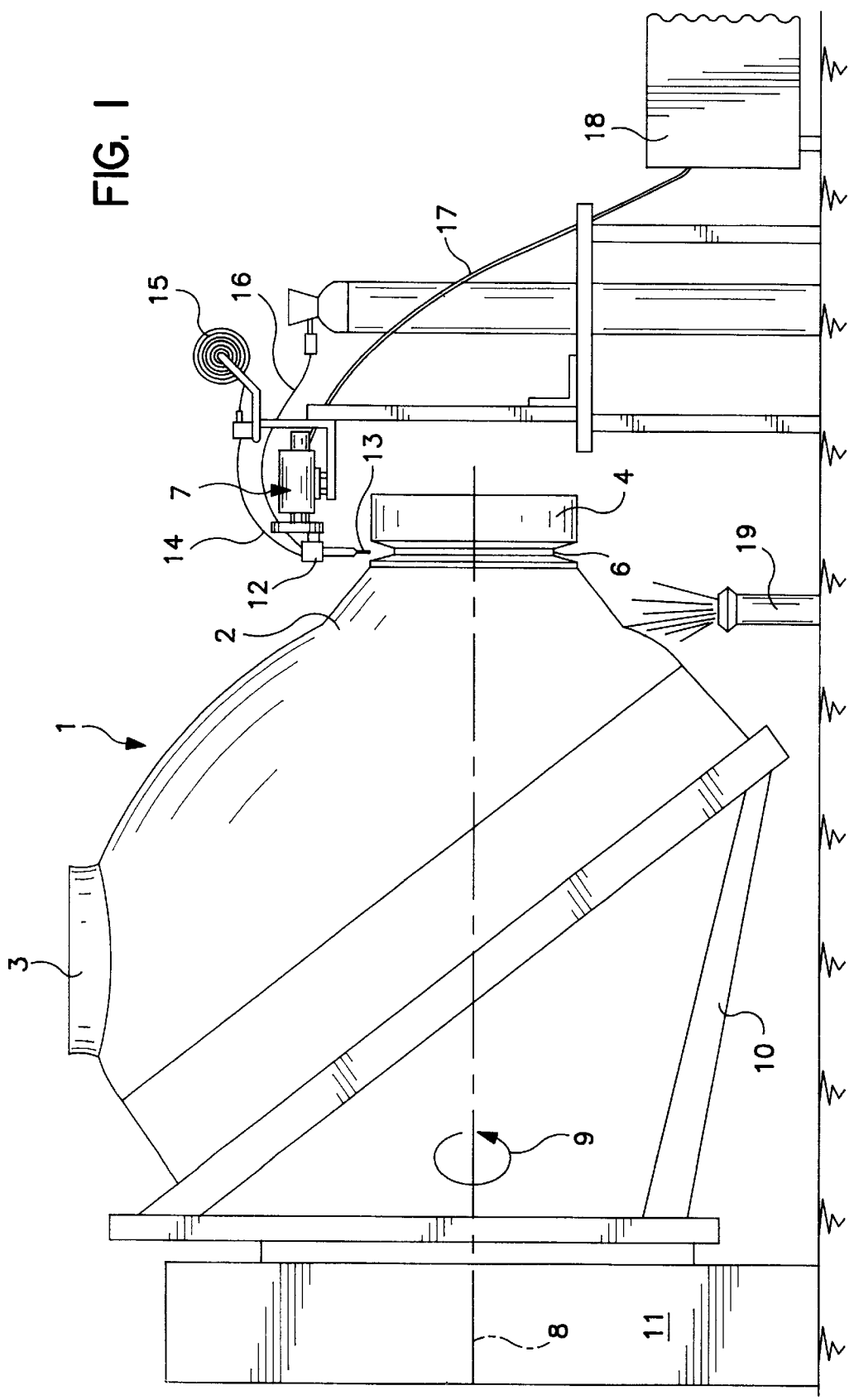
FIG. 1 is an elevation view of the bottom part of a steam generator of a pressurized water nuclear reactor, seen during an operation to joint a pipe to a connecting tube of the steam generator by the method of the invention, together with a device for implementing this method.

FIG. 1 shows the bottom part 1 of a steam generator of a pressurized water nuclear reactor. The steam generator bottom part 1 consists of an enclosure in the shape of a spherical dome through which pass two openings in the form of connecting tubes 2 and 3 for connecting pipes of the primary circuit of the nuclear reactor.

The bottom part of the steam generator and the connecting tubes 2 and 3 are made of low alloy constructional steel and are lined with a layer of stainless steel.

The pipes of the primary circuit that must be connected to the connecting tubes 2 and 3 of the steam generator bottom part are made of austenitic stainless steel. Welding the pipes to the connecting tubes necessitates heterogeneous welding.

FIG. 1 shows a portion 4 of an austenitic stainless steel primary pipe in the process of jointing it to the connecting tube 2 by a welding method in accordance with the invention. The primary pipe portion 4 can, for example, constitute a connector for subsequent jointing to a primary pipe by heterogeneous welding of two tubular austenitic stainless steel parts.

The heterogeneous weld between the austenitic stainless steel connector 4 and the low alloy constructional steel connecting tube 2 is effected by filling a groove 6 with filler metal deposited in the molten state into the groove by a TIG welding head 7.

The groove 6 is obtained by machining the end part of the connecting tube 2 and an end part of the connector 4 and then placing the machined surfaces face-to-face so that they constitute the two annular lateral faces of the groove 6. The connector 4 is held in axial alignment with the opening in the steam generator bottom part and the connecting tube 2 by a tubular jig inserted in the interior bore in the connector 4 and the connecting tube 2. This tubular jig can at the same time constitute a welding lath in contact with the bottom of the groove 6.

The combination of the steam generator bottom part 1 and the tubular connector 4 is fixed to a support 10 that is rotated about the axis 8 common to the connecting tube and to the tubular connector 4, as shown by the arrow 9, in order to fill the groove 6 with the filler metal all around its periphery. The groove 6 is filled by successive passes during each of which, as far as possible, a layer of the filler metal is deposited across all of the width of the groove. During each of the successive welding passes the steam generator bottom part 1 rotates about the axis 8 by slightly more than one turn. This assures overlapping of the successive layers of filler metal.

FIG. 1 also shows the welding installation including the support 10 for the steam generator bottom part 1 which is rotated about the axis 8 by a motorized positioner 11.

The TIG welding head 7 carries a welding torch 12 including a tungsten welding electrode 13 introduced into the welding groove 6 in a substantially vertical direction and in a substantially central position. The welding torch 12 is fed with filler wire 14 by a spool 15 of filler wire carried by the welding head 7. The welding torch 12 is fed with an inert gas which can be argon, a mixture of helium and argon, helium or another inert gas or gas via a feed pipe 16.

The welding head 7 is also connected by a power supply cable 17 to an electrical generator 18, so that the electrode is fed with a precisely defined electric current and a precisely defined voltage.

An electric arc is formed between the electrode 13 and the bottom of the groove 6 which can be already partly filled with filler metal. The filler metal wire melts in the arc and is deposited onto the bottom of the groove vertically below the electrode 13. As the steam generator bottom part rotates, a layer of filler metal is deposited into the bottom of the groove, preferably across all of the width of the groove between the connecting tube 2 and the tubular connector 4. The connecting tube 2 is preheated near the jointing area, using a preheater system 19 which can be disposed outside the steam generator bottom part, for example.

Figure 2:
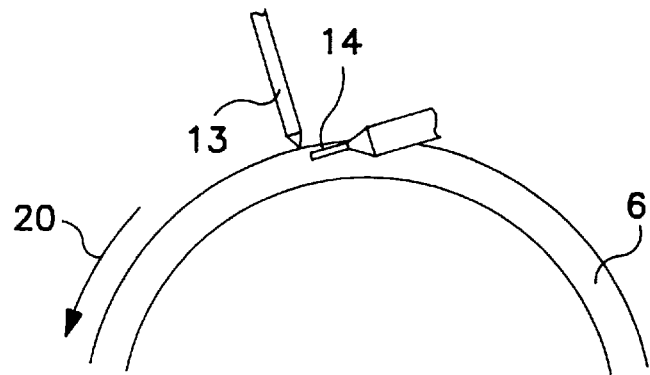
FIG. 2 is a schematic cross-section of the welding groove and of the electrode and the filler wire of the welding head of the device.

FIG. 2 is a schematic representation of the groove 6 formed between the parts rotating in the direction indicated by the arrow 20.

The electrode 13 is inclined to the vertical in the direction of the arrow 20 (at approximately 10°). The filler metal wire 14 is fed in front of the electrode 13 relative to the rotation direction 20 of the parts. The filler metal wire 14 is advanced continuously into the area where the electric arc is formed between the electrode 13 and the bottom of the groove 6. The pool of liquid metal consisting of the melted filler metal is deposited onto the bottom of the groove between the rotating parts. This forms what is known as a "string bead".

Figure 3A:
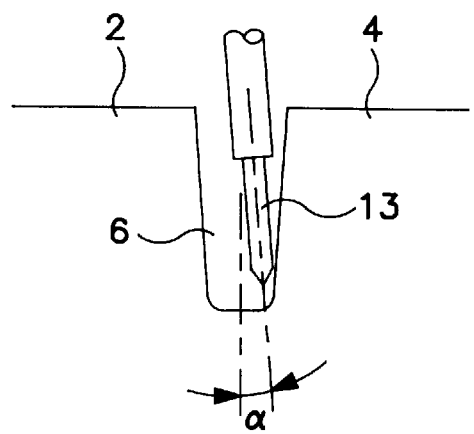
FIGS. 3A and 3B are schematic views in longitudinal section showing the disposition of the welding electrode in the groove during execution of two variants of the welding method of the invention.

FIG. 3A shows the groove 6 in axial section, i.e., in section on a plane passing through the axis 8 common to the connecting tube 2 and to the connector 4.

The axis of the electrode 13 is in a plane at a small angle α, in the order of a few degrees; to the vertical, and directed towards the austenitic steel connector 4.

Figure 3B:
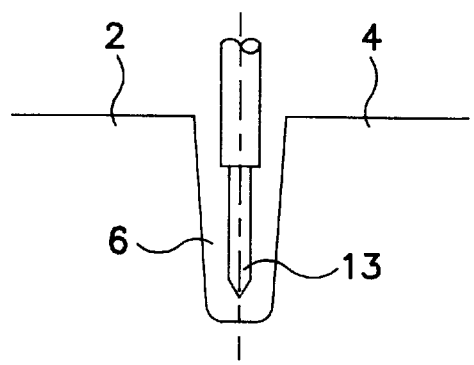

FIG. 3B shows the electrode 13 with its axis in a vertical plane.

The method of the invention can be executed using an electrode whose axis is slightly inclined towards the austenitic stainless steel part or a vertical electrode, but in this latter case the electrode can be slightly offset towards the austenitic stainless steel part 4.

The filler wire is generally made of an alloy based on nickel and chromium.

Figure 4:
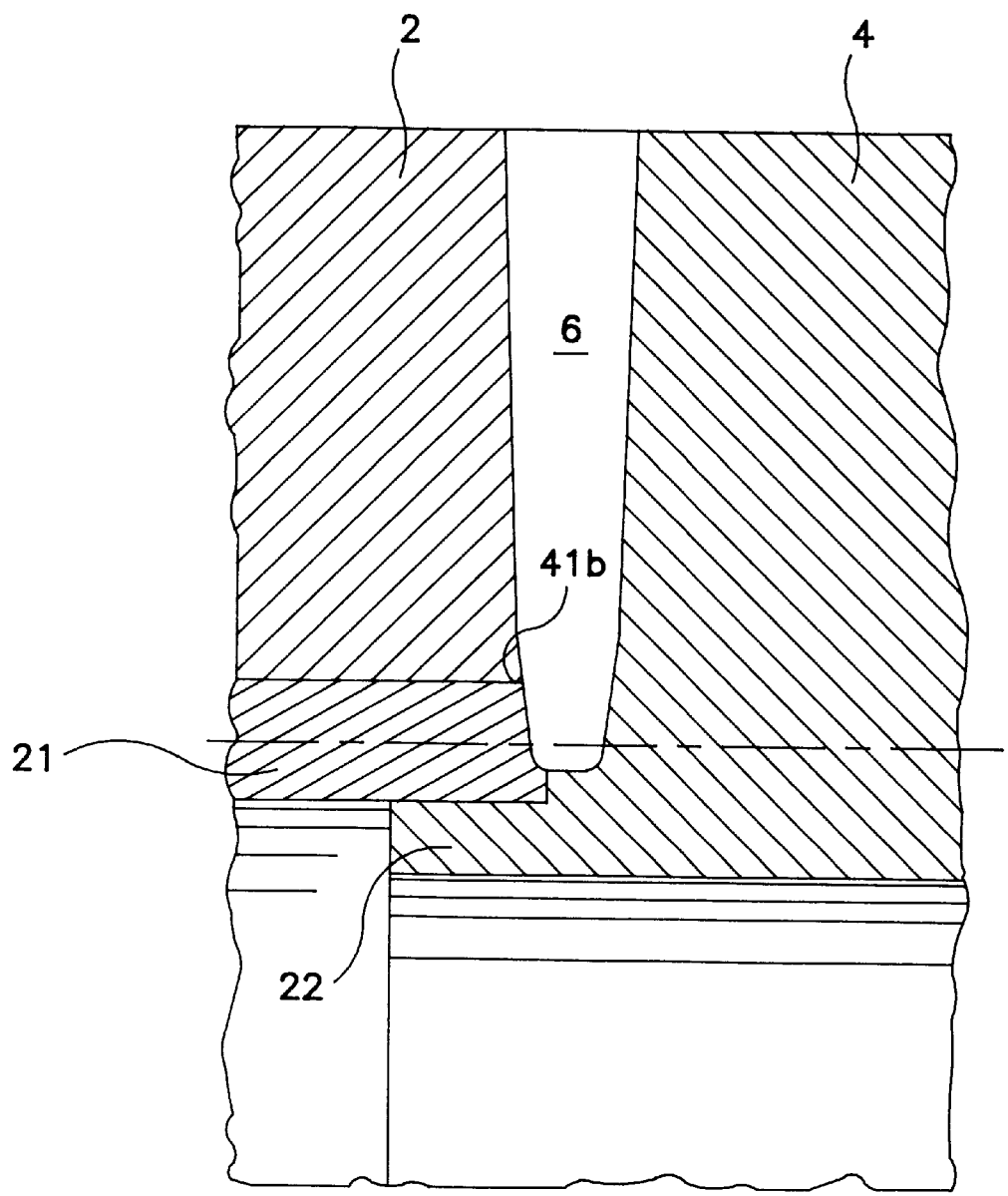
FIG. 4 is a view in axial section of a welding groove used in a jointing method of the invention.

FIG. 4 shows to a larger scale the welding groove 6 between the facing ends of the low alloy constructional steel connecting tube 2 and the austenitic stainless steel connector 4. The austenitic stainless steel of the part 4 is a 316L type steel. The connecting tube 2 is lined with a layer 21 of stainless steel of the 308L or 309L type, for example.

The inside edge of the end portion of the austenitic stainless steel connector 4 is machined to constitute an annular 22 projecting towards the connecting tube 2.

The lateral surfaces of the groove machined in the connector 4 and in the connecting tube 2 are substantially symmetrical relative to a median plane of the groove and slightly inclined outwards in the direction from the inside towards the outside of the parts. The lateral surface of the groove on the same side as the connecting tube 2 is machined in the metal of the connecting tube and in the stainless steel lining layer 21. In the position for jointing the parts the heel piece 22 of the stainless steel connector 4 overlaps the lining layer 21 inside the parts.

The groove 6 delimited by the parts 2 and 4 has lateral faces slightly inclined relative to the median plane of the groove (vertical plane).

In the interior part of the groove the angle of inclination of the lateral walls of the groove to the vertical median plane is around 4°. In the remainder of the groove opening onto the outside surface of the parts, the inclination of the lateral walls relative to the vertical median plane is in the order of 1°.

The width of the groove in the axial direction of the parts perpendicular to the radial direction (thickness of the parts) and to the circumferential direction (longitudinal direction of the groove) varies from a minimal value in the order of 8 mm at the bottom of the groove to a maximal value in the order of 12.5 mm at the outside surface of the parts.

Figure 5:
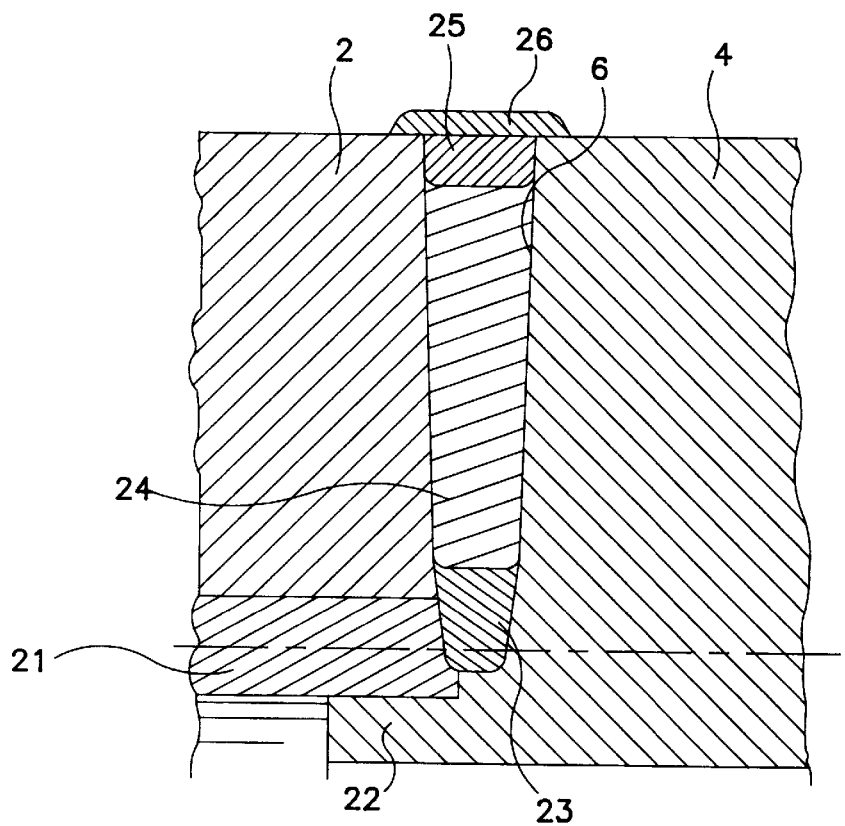
FIG. 5 is a view in axial section showing various areas of a groove filled with filler metal under different conditions.

A groove as represented in FIG. 5 having the dimensional characteristics given above can generally be filled with successive layers of filler metal in the direction of the thickness of the parts each comprising a single weld bead extending between the two lateral edges of the groove, i.e., between the part 2 and the part 4. Nevertheless, it is within the scope of the invention to fill a groove with layers of filler metal, some of which incorporate more than one weld bead. It may be necessary to complete a first weld bead deposited in the groove by one or more beads overlapping the first weld bead and joining the layer to the edges of the groove.

As explained below, the welding parameters must be set to suit the width of the welding groove 6, which varies in the direction of the thickness of the parts 2 and 4.

The welding process is an automatic TIG process using a pulsed direct current. The pulse frequency can be in the order of two periods per second, for example. During a first part of the cycle corresponding to one period, the welding current is fixed at a value $I_h$ corresponding to a high level during the second part of the cycle it is fixed at a second value $I_b$ lower than $I_h$ corresponding to a low level. During the high level of the period, the electrical arc extends substantially over the whole width of the groove, while in the low level of the period the electric arc is smaller and concentrated in the central part of the groove.

The filler metal 14 can be fed into the electric arc at a first speed during the first part of the period and at a speed lower than the first during the second part of the period. During the first part of the period, the current being at its maximal value $I_h$, the filler metal wire arrives in the area swept by the electric arc and melts, so that the filler metal fills the bottom of the groove. At the end of the first part of the cycle, the voltage and the current are reduced to their low value, and simultaneously the wire feed rate is reduced from its first value to its second value. The spreading of the liquid metal over the bottom of the groove, in the form of the deposited layer, occurs during the second part of the cycle, the current being fixed at the value $I_b$ and the wire feed rate at its second value.

It may equally be possible to feed the wire into the electric arc at a constant speed.

It will be shown hereinafter that, by fixing $I_h$, $I_b$, the arc voltage U and the wire feed rate V at values defined in accordance with the width of the groove, a regular deposit of filler metal is obtained in the form of a layer with good consistency and constant thickness in which the deposited metal is of good metallurgical quality.

FIG. 5 is a schematic representation of the various filling areas of the groove 6 between the low alloy connecting tube 2 and the austenitic stainless steel connector 4.

A first or root area 23 situated in a first part of the groove near the inner portion of the parts 2 and 4 is filled during the first or root welding passes with a filler metal consisting of a first nickel alloy (alloy 52).

A second or filling area 24, situated in a middle part of the groove 6 between the inner portion and the outer portion of the parts 2 and 4, is filled during welding with successive layers of a second nickel alloy (alloy 82).

A third area 25, situated in the vicinity of the outer portion of the parts 2 and 4, is also filled during welding with filler metal consisting of the second nickel alloy, but with different welding parameters compared to those for the second area 24.

A finish layer 26 projecting slightly to the exterior of the parts 2 and 4 can optionally be effected.

Alternatively, all of the groove can be filled with layers all made from the first nickel alloy (alloy 52).

After welding, the inner portion of the welded parts can be machined to eliminate the heel piece 22 and part of the weld root 23.

The welding parameters $I_h$, $I_b$, V and U are fixed at values that depend on the width of the groove between the parts 2 and 4 during the root and filling passes so that successive layers of filler metal are deposited with perfect quality and essentially consisting of a single weld bead occupying practically all of the width of the groove.

The table below indicates the range of adjustment of the welding parameters $I_h$, $I_b$, V and U and the welding speed Va for a groove varying in width between 8 mm and 12.5 mm between the bottom of the groove (start of root passes) and the top of the groove (end of filling). The range of variation of the width of the groove in the areas 23, 24 and 25 has been divided into four sub-ranges (8 to 9.5 mm; 9.5 to 11 mm; 11 to 12 mm; 12 to 12.5 mm) within each of which the welding parameters can be adjusted about a fixed value in the range given in the table.

TABLE

| Width of groove 8–12.5 mm | $I_h$ (A) | $I_b$ (A) | Welding speed $V_a$ (cm/min) | Wire feed rate V (m/min) | Arc voltage (U) |
|---|---|---|---|---|---|
| min | 260 | 140 | 7 | 1.5 | 11 |
| max | 340 | 200 | 9 | 3 | 14.5 |

The table concerns automatic TIG welding of a 16MND5 steel connecting tube and a 316L stainless steel connector. The connecting tube is lined with stainless steel. A solid filler wire 0.9 mm in diameter and a tungsten electrode 3.2 mm in diameter are used. The welding process uses a pulsed direct current as defined above and is of the type producing a "string bead".

The parts are preheated to a temperature in the range 175° C., to 225° C., and an inert gas is fed into the welding area from outside the parts.

The high value $I_h$ of the pulsed current can be held at a fixed value (for example 300 Amperes) during all welding phases, and the low value $I_b$ of the current can be varied to suit the width of the groove within the defined range of variation.

The wire feed rate V is fixed according to the width of the groove within each of the defined sub-ranges of variation.

Figure 6:
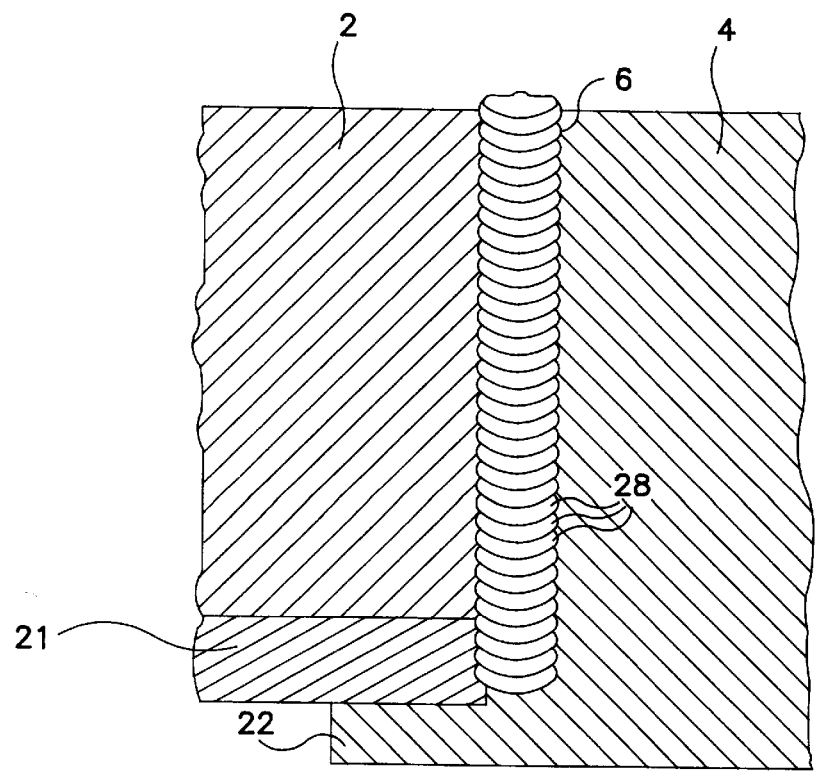
FIG. 6 is a view in axial section of a heterogeneous welded joint effected by the method of the invention.

FIG. 6 shows the successive layers 28 of filler metal deposited in the groove 6, using the welding method of the invention, i.e., by fixing the welding parameters according to the width of the groove.

Each of the layers 28 comprises a single weld bead. The liquid metal deposited in the groove extends across the width of the entire groove between the part 2 and the part 4. During welding the marginal areas of the parts 2 and 4 at the edge of the groove 6 are not melted by the electric arc of the welding torch. The liquid filler metal coming into contact with the marginal portions of the parts 2 and 4 at the edges of the groove 6 heats these marginal areas by thermal conduction and assures on each of the parts a metallurgical bond of very good quality between the layer of filler metal and the marginal portions of the parts 2 and 4, with low and well controlled dilution.

Adjusting the welding conditions according to the width of the groove procures conditions that are entirely reproducible, insofar as jointing the successive layers of filler metal to the marginal portions of the parts 2 and 4 is concerned.

After welding, the heel piece 22 of the part 4, a part of the root of the weld and the metal deposited on the outside portion of the groove at the end of welding can be machined.

The method of the invention enables entirely reproducible welds to be obtained consisting of superposed layers each consisting essentially of a single weld bead between two parts with different compositions and metallurgical structures.

Welds consisting of layers each comprising a single weld bead deposited during a single welding pass have been obtained with a groove between the parts to be jointed whose lateral walls are inclined relative to a median plane by less than around 5° and whose width between the parts to be jointed is at most equal to approximately 16 mm. A groove of this kind is known as a narrow groove.

The filler metal used to joint a low alloy constructional steel and an austenitic stainless steel is a grade of nickel alloy containing chromium which assures very high mechanical strength of the welded joints.

The parameters can be adjusted according to the width of the groove in a different manner to that described. The geometry of the groove is generally perfectly known, and in particular the variation of the width of the groove in the direction of the thickness of the path can be determined very precisely. It is possible to adjust the parameters directly according to the width of the groove using pre-established relations or to fix desirable values of the welding parameters within defined ranges of the width of the groove in advance by calibration.

The method of the invention can use welding processes other than the pulsed direct current process described above. In all cases, the welding current and voltage and the wire feed rate are adjusted during all welding phases regardless of the current variation law and the voltage variation law during these welding phases.

The invention can be applied to welding parts having a shape other than a tubular shape.

What is claimed is:

1. A method of jointing by heterogeneous welding a first part made of constructional steel and a second part made of austenitic stainless steel, consisting in disposing machined ends of the parts face-to-face to constitute a welding groove extending in a longitudinal direction between said first and second parts and depositing a nickel-based alloy filler in the welding groove in successive layers extending in said longitudinal direction and superposed in a direction perpendicular to said longitudinal direction of said groove corresponding to a thickness of said first and second parts, by melting a wire fed at a particular speed into an electric arc formed between an electrode fed with a particular welding current at a particular voltage and the parts to be welded which are separated, in a direction perpendicular to said longitudinal direction of said groove and to the direction of said thickness of said first and second parts, by a distance constituting the width of said groove, said welding groove being a narrow groove delimited by lateral walls at an angle of less than approximately 5° to a median plane of said groove and having a maximal width of approximately 16 mm, each layer of filler metal essentially comprising a weld bead obtained by melting the filler metal wire occupying practically all of the width of said groove, wherein said method comprises determining the welding current and voltage and the feed rate for said metal wire constituting welding parameters, according to the width of said groove.

2. The method according to claim 1, comprising determining a plurality of ranges of the width of the groove and fixing the values of the welding current, the welding voltage and the feed rate for the filler metal wire constituting the welding parameters, at a value determined within each of the ranges of the width of the groove.

3. The method according to claim 1, comprising determining within each of the ranges of the width of the groove, a value to which the welding parameters and the margins of variation of the welding parameters are adjusted.

4. The method according to claim 1, in the case of welding using a pulsed direct welding current having a high value ($I_h$) in a first part of a period of the current and a low value ($I_b$) in a second part of the period, comprising fixing the low value ($I_b$) of the welding current, the feed rate of the filler metal wire during the first part of the period and during the second part of the period and the arc voltage (U), at values depending on the width of the groove, and maintaining the current ($I_h$) during the first part of the pulse at a fixed value regardless of the width of the groove.

5. The method according to claim 1, wherein the first part and the second part are tubular parts disposed end-to-end so as to delimit between them a welding groove, the longitudinal direction of which is a circumferential direction of the parts, the second direction of the thickness of the parts is a radial direction and wherein the direction of the width of the groove extends to an axial direction of the parts.

6. The method according to claim 1, wherein said first part is a constructional steel connecting tube of a steam generator bottom part of a pressurized water nuclear reactor and said second part is one of an austenitic stainless steel pipe of the primary circuit and an austenitic stainless steel connector to the primary circuit of the nuclear reactor.

* * * * *